US010970539B2

(12) United States Patent
 Partington (10) Patent No.: US 10,970,539 B2
(45) Date of Patent: Apr. 6, 2021

(54) BINDING OF SELFIE FACE IMAGE TO IRIS IMAGES FOR BIOMETRIC IDENTITY ENROLLMENT

(71) Applicant: Tascent, Inc., Los Gatos, CA (US)

(72) Inventor: Alastair Ross Partington, Minnetonka, MN (US)

(73) Assignee: Tascent, Inc., Los Gatos, CA (US)

( * ) Notice: Subject to any disclaimer, the term of this patent is extended or adjusted under 35 U.S.C. 154(b) by 77 days.

(21) Appl. No.: 16/136,032

(22) Filed: Sep. 19, 2018

(65) Prior Publication Data

US 2019/0087657 A1 Mar. 21, 2019

Related U.S. Application Data

(60) Provisional application No. 62/561,630, filed on Sep. 21, 2017.

(51) Int. Cl.
| | |
|---|---|
| *G06K 9/00* | (2006.01) |
| *G06T 7/70* | (2017.01) |
| *G06Q 20/40* | (2012.01) |
| *G06T 7/11* | (2017.01) |

(52) U.S. Cl.
CPC ..... *G06K 9/00617* (2013.01); *G06K 9/00255* (2013.01); *G06K 9/00281* (2013.01); *G06K 9/00604* (2013.01); *G06Q 20/40145* (2013.01); *G06T 7/11* (2017.01); *G06T 7/70* (2017.01); *G06T 2207/30201* (2013.01)

(58) Field of Classification Search
CPC .......... G06K 9/00255; G06K 9/00604; G06K 9/00617; G06K 9/00281; G06T 7/11; G06T 7/70; G06T 2207/30201; G06Q 20/40145
USPC .................................. 382/117–118, 209, 218
See application file for complete search history.

(56) References Cited

U.S. PATENT DOCUMENTS

| | | | | |
|---|---|---|---|---|
| 2016/0012445 | A1* | 1/2016 | Villa-Real | G06Q 20/36 705/44 |
| 2017/0124394 | A1* | 5/2017 | Thavalengal | G06T 5/00 |
| 2017/0140221 | A1* | 5/2017 | Ollila | G06K 9/00604 |
| 2017/0364897 | A1* | 12/2017 | Sarkar | G06Q 30/0643 |

* cited by examiner

*Primary Examiner* — Daniel G Mariam
(74) *Attorney, Agent, or Firm* — Fenwick & West LLP (57) ABSTRACT

An imaging system associates one or more the iris images with a selfie face image for biometric identity. The imaging system captures a first image of a subject using light in a visible wavelength range and captures a second image of the subject using light in a near infrared wavelength range. The image system retrieves a selfie face image of the subject, and matches a face portion of the first image against a face portion of the selfie face image, wherein the face portion for each at least comprises an iris. In response to the matching, the image system segments one or more iris portions from the second image to generate one or more iris images and binds the first image and the one or more iris images to the selfie face image for biometric identity.

20 Claims, 5 Drawing Sheets

```
┌─────────────────────────────────────────────┐
│ Generate 3D Illumination Intensity Map Of   │
│ Subject's Face                              │
│ 310                                         │
└─────────────────────────────────────────────┘
                      ↓
┌─────────────────────────────────────────────┐
│ Determine Locations Of Subject's One Or More│
│ Eyes Based On 3D Illumination Intensity Map,│
│ Wherein Locations At Least Comprise Distance│
│ Between Imaging System And Subject's One Or │
│ More Eyes                                   │
│ 320                                         │
└─────────────────────────────────────────────┘
                      ↓
┌─────────────────────────────────────────────┐
│ Determine Average Pixel Value Of Face's     │
│ Portion Containing One Or More Eyes         │
│ 330                                         │
└─────────────────────────────────────────────┘
                      ↓
┌─────────────────────────────────────────────┐
│ Convert 3D Illumination Intensity Map Into  │
│ 2D Illumination Intensity Map At Locations  │
│ 340                                         │
└─────────────────────────────────────────────┘
                      ↓
┌─────────────────────────────────────────────┐
│ Normalize 2D Illumination Intensity Map     │
│ Based On Average Pixel Value                │
│ 350                                         │
└─────────────────────────────────────────────┘
                      ↓
┌─────────────────────────────────────────────┐
│ Capture Iris Image Based On Normalized 2D   │
│ Illumination Intensity Map And Locations    │
│ 360                                         │
└─────────────────────────────────────────────┘
```

Capture Very-high-resolution (VHR) Face Image Of Subject Using Light In Visible Wavelength Band, Infrared Wavelength Band, Or Both
510

↓

Retrieve Selfie Face Image Of Subject, Wherein Selfie Face Image Was Previously Captured By Image Device
520

↓

Match Captured VHR Face Image In Visible Wavelength Band Against Selfie Face Image
530

↓

Responsive To Matching, Segmenting One Or More Iris Images From Captured VHR NIR Face Image
540

↓

Bind Captured VHR Face Image And Segmented One Or More Iris Images To Selfie Face Image For Biometric Identity
550

FIG. 5

BINDING OF SELFIE FACE IMAGE TO IRIS IMAGES FOR BIOMETRIC IDENTITY ENROLLMENT

CROSS-REFERENCE TO RELATED APPLICATIONS

This application claims priority to U.S. Provisional Application No. 62/561,630, filed Sep. 21, 2017, which is incorporated by reference herein in its entirety.

BACKGROUND

The present disclosure generally relates to imaging facial features, and specifically relates to iris imaging.

Imaging of a human iris is often performed by illuminating a spatial volume that includes the face of a subject and then recording an image of an illuminated iris. Near infrared light (NIR) is often used for illumination because pigmentation in the iris is more transparent in the infrared spectrum. The transparency of the pigmentation exposes the fine structures of the iris to the imaging system. Iris images are useful for performing biometric identification. Iris-based biometric identification typically requires a spatial resolution of 200 microns, or better, with a pixel resolution of approximately 60 microns for an ISO standard 19794-6-compliant image. In general, higher spatial resolution leads to better matching performance by better distinguishing the fine muscle structure of human irises.

Illumination systems used for iris imaging, particularly biometric imaging, regularly comprise multiple illumination sources that flood the ocular areas (i.e., the areas surrounding and including the eyes of the subject) with a uniform or near uniform intensity of light. This type of arrangement facilitates adequate illumination of the ocular area and any irises within the ocular area.

SUMMARY

With widespread adoptions of smartphones and HD webcams, many people have the capability to capture high-resolution biometric face images. This description provides a mechanism for making use of these images to provide self-pre-enrollment for identity systems. Self-pre-enrollment is a process used in a wide range of scenarios such as building physical access control, voter registration, personal banking, expedited travel and immigration, etc. However, these self-captured face images (herein referred to as "selfie" face images) are typically of variable biometric quality (for example, may be impacted by shadows, poor orientation, sub-optimal camera positioning, and/or confusing backgrounds). This impacts an accuracy of biometric systems that might make use of selfie face images, and limits their value.

Biometric systems can also quality-check and reject selfie-capture face images that fail to meet biometric quality thresholds. This limits the proportion of pre-enrollments that are accepted by the system and constrains its effectiveness. It does not improve on the relatively low biometric accuracy of selfie-face images. Selfie-capture face biometric systems can provide feedback to the user on static (still photo) or dynamic (live video) images, to help them improve the quality of the image, however these are rarely sufficient to overcome all the shortcomings of the image from a biometric perspective, and as such the relatively low biometric accuracy of selfie-face images remains an issue. The system and process described herein address these issues.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview for Capturing Dual Iris and Face Images

Figure 1:
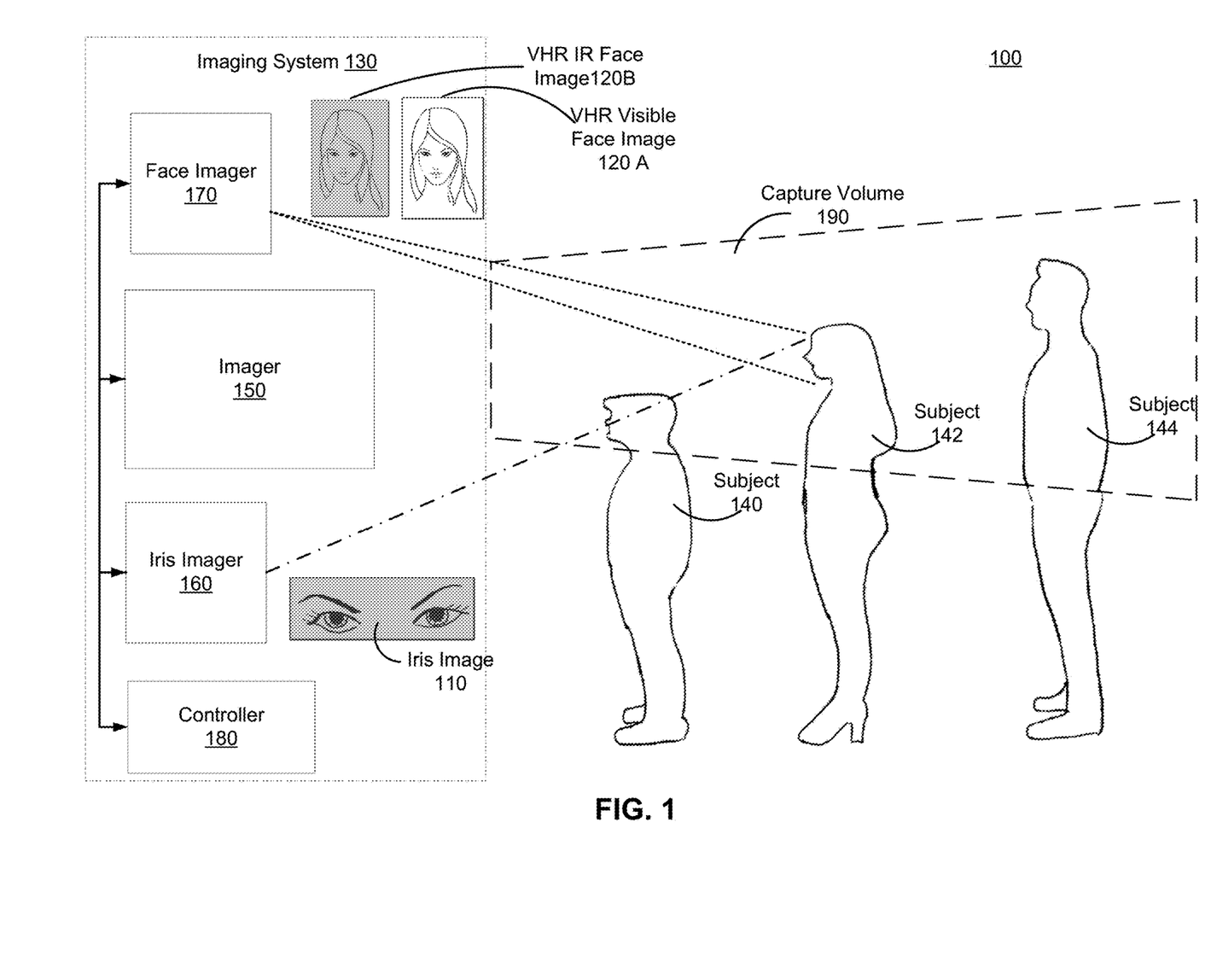
FIG. 1 is a system environment including an imaging system for capturing very-high-resolution (VHR) dual iris and face images, in accordance with an embodiment.

FIG. 1 is a system environment 100 including an imaging system 130 for capturing dual iris (e.g., an iris image 110) and face (e.g., face image 120A and 120B) images, in accordance with an embodiment. The system environment 100 shown by FIG. 1 includes the imaging system 130, and one or more subjects (e.g., 140, 142, and 144). The imaging system 130 includes an imager 150, an iris imager 160, a face imager 170, and a controller 180. In alternative configurations, the controller 180 may be included in the 3D imager 150, in the iris imager 160, or in the face imager 170. In one embodiment, the imaging system 130 includes the imager 150, the iris imager 160, and the controller 180, but omits the face imager 170. In another embodiment, the imaging system 130 includes the face imager 170, and the controller 180, but omits the 3D imager 150 and the iris imager 160. These latter embodiments can occur in instances where the imaging system 130 carries out particular aspects of the processes described below, and may additionally or alternatively include instances where more than one imaging system 130 are used together (though not necessarily contemporaneously) to carry out the processes described herein. For example, different imaging system 130 may be used to capture face and iris images.

The imaging system 130 captures face and iris images of the one or more subjects within a capture volume 190. The capture volume 190 describes a range in which a subject is captured by the imaging system 130. If the subject is not located within the capture volume 190, the subject is not captured by the imaging system 130. The captured volume 190 can be determined based on a range of a standoff distance (not explicitly labeled) and a range of a subject's height (not explicitly labeled). The standoff distance is a distance separating the imaging system 130 and a subject being imaged. If the subject is located within the range of the standoff distance and the range of the subject height, the subject is captured by the imaging system 130, otherwise, the subject is not captured. In some embodiments, the range of the standoff distance is up to a value that equals or is larger than 1 meter (m), and the range of the subject's height is up to a value that equals or is larger than 2 m. In some embodiments, the captured volume depends on a field of view (FOV) of the 3D imager 140, an FOV of the iris imager 160, and an FOV of the face imager 170. For example, the captured volume 190 is a common range (e.g., an overlap range of the above three FOVs) in which the subject is simultaneously captured by the 3D imager 150, the iris imager 160 and the face imager 170.

The imager 150 determines a location of a subject within the capture volume 190. In one embodiment, the imager 150 is a 3D imager 150 that captures a 3D image (e.g., an image in x, y, z Cartesian coordinate system) of the subject to determine the location. The imager 150 locates the face of a subject using a face-finding software to facilitate an illumination intensity calibration of the iris imager 160. The face-finding software cycles through a sequence of illumination intensities and stops when a face is found, as further described in FIG. 2. This accommodates for variations in ambient light values, for variations in an illumination hardware, for position-dependent variations in intensity, and for variations in a skin tone. This is useful because, in practice, intensity can vary on the order of 4× over the capture volume due to geometric divergence alone.

The imager 150 includes an illumination source (not shown) and a camera (not shown). The illumination source illuminates a portion of a subject with light in a NIR wavelength band (e.g., approximately 700 nanometers (nm) to approximately 900 nm), or with light in a visible wavelength band. Examples of the illumination source include a laser (e.g., a tunable laser, a continuous wave laser, a pulse laser, other suitable laser emitting NIR light), a light emitted diode (LED), a fiber light source, a white light source, another other suitable light source emitting infrared and/or visible light, or some combination thereof.

The camera detects reflected and/or scattered light from the illuminated portion of the subject. If the camera is a 3D camera, examples of 3D cameras include stereo cameras, range cameras, and depth of field cameras. The stereo camera is a type of camera with two or more lenses with separate image sensors or film frame for each lens, which allows the camera to simulate human binocular vision, and therefore capture 3D images. The stereo camera may be a digital camera. The stereo camera may include multiple cameras (e.g., dual cameras, or a combination of a camera and a lens). The range camera is a device that produces a 2D image showing a distance to points in a scene from a specific point. The range camera may be based on a stereo triangulation, a sheet of light triangulation, a structured light, a time-of-flight, an interferometry, a coded aperture, a LIDAR, a radar, or some combination thereof.

The imager 150 may additionally include one or more additional optical elements (not shown). Examples of optical elements include an aperture, a Fresnel lens, a convex lens, a concave lens, and an optical filter. One or more optical elements may be placed between the subject and 3D camera, and/or placed between the subject and the illumination source. One or more of the optical elements in the imager 150 may have one or more coatings, such as partial reflectors or anti-reflective coatings.

The iris imager 160 captures an iris image of a subject (e.g., the iris image 110 of the subject 142) based on the determined location in an IR wavelength band. A iris image meets or exceeds ISO 29794-6. The iris imager 160 also calibrates illumination intensity based on the captured image of the 3D imager 150, as further described in FIG. 2.

The iris imager 160 includes an illumination source (not shown) and a sensor (not shown). The illumination source illuminates an iris region of a subject. The illumination source may be an embodiment of the illumination source used in the 3D imager 150. Alternatively, the iris imager 160 may use the illumination source of the 3D imager 150. The sensor detects reflected and/or scattered light from the illuminated iris region in the IR wavelength range. Examples of the sensor include a complementary metal-oxide-semiconductor (CMOS) sensor, and a charge-coupled device (CCD) sensor. The iris imager 160 may additionally include one or more additional optical elements (not shown) that may have one or more optical coatings. For example, one or more optical elements may be placed between the subject and the sensor, and/or may be placed between the illumination source and the subject.

The face imager 170 captures one or more VHR face images of a subject (e.g., the face images 120A and 120B of the subject 142) based on the determined location. In various embodiments, the face imager 170 simultaneously captures a VHR visible face image 120A in a visible wavelength band and a VHR NIR face image 120B in an NIR wavelength band. The VHR visible face image 120A is matched using a biometric algorithm against a selfie face image captured by an image device (e.g., a smartphone camera or a webcam). The face imager 170 extracts an iris region from the VHR face image for a biometric identity enrollment, as further described in FIG. 4 and FIG. 5. Alternatively, the location of the subject can be determined by the face imager 170.

The face imager 170 includes a sensor that detects reflected and/or scattered light from the face of the subject. Examples of the sensor include a CMOS sensor, and a CCD sensor. The face imager 170 may also include an illumination source to illuminate the face with light in a visible light wavelength band, and with light in an IR wavelength band. The illumination source may be an embodiment of the illumination source used in the 3D imager 150. Alternatively, the face imager 170 may use the illumination source of the 3D imager 150. The face imager 170 may additionally include one or more additional optical elements (not shown) that may have one or more optical coatings. One or more optical elements may be placed between the subject and the sensor, and/or may be placed between the subject and the illumination source.

The controller 180 controls the 3D imager 150, the iris imager 160, and the face imager 170. The controller 180 generates commands to instruct the 3D imager 150 to perform fixed spatial and dynamic calibrations to compute illumination intensities for capturing an iris image of a subject using the iris imager 160, as further described in FIGS. 2 and 3. The controller 180 generates commands to instruct the iris imager 160 to capture the iris image of the subject using the computed illumination intensities and the subject's location determined by the 3D imager 150. The controller 180 generates commands to instruct the face imager 170 to match the VHR face image against the selfie face image and instruct the face imager 170 to extract the iris region for biometric identity enrollment, as further described in FIGS. 4-6.

Fixed Spatial and Dynamic Calibrations

Figure 2:
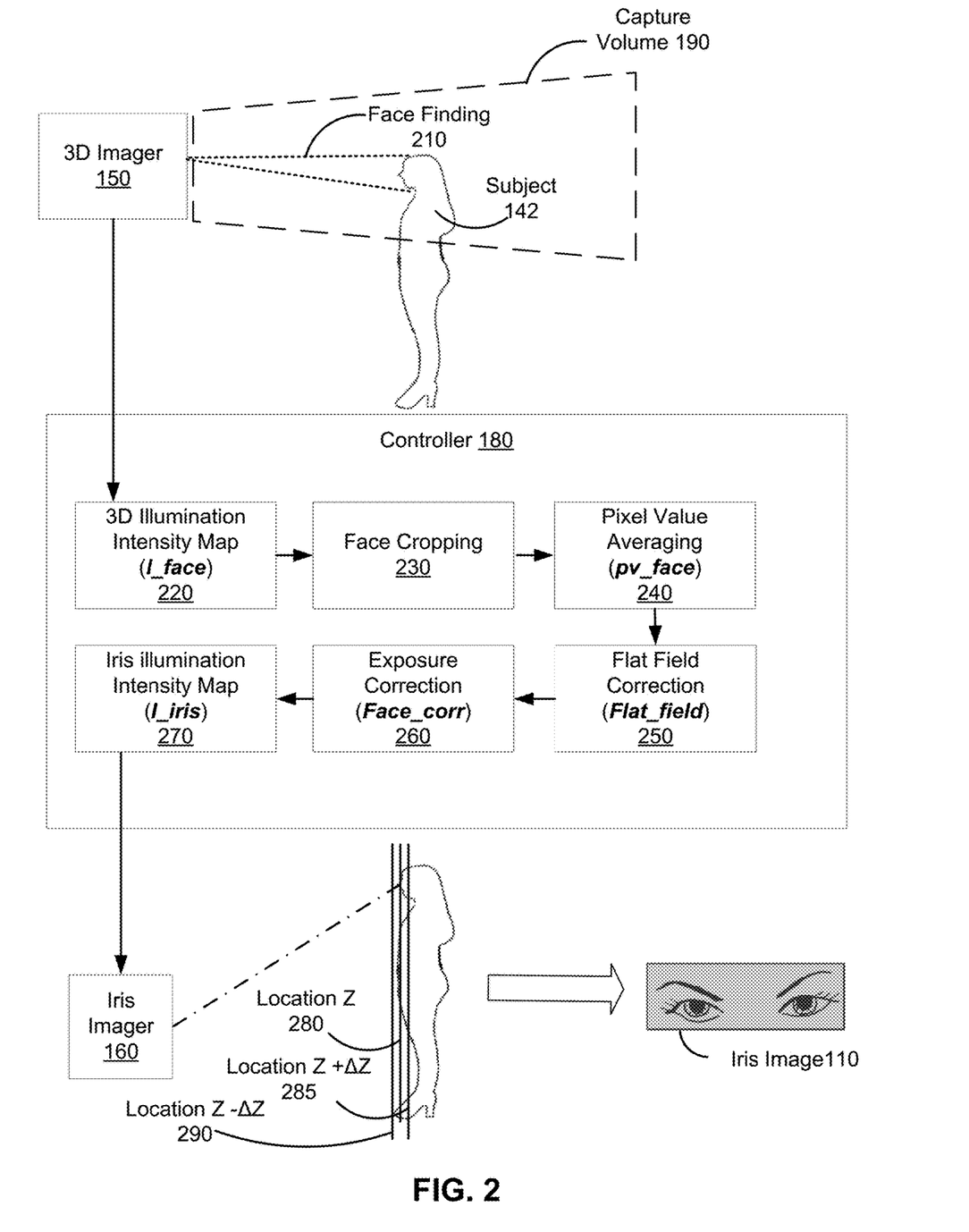
FIG. 2 is an example of capturing an iris image using fixed spatial and dynamic calibrations to compute illumination intensities, in accordance with an embodiment.

FIG. 2 is an example of capturing the iris image 110 using fixed spatial and dynamic calibrations to compute illumination intensities, in accordance with an embodiment. The 3D imager 150 performs a fixed spatial calibration that generates a 3D spatially calibrated camera gain map (which may be implemented as a look-up table stored in memory) for each pixel (also referred to as a pixel-by-pixel gain map) of a 3D image captured by the 3D imager 150. The 3D spatially calibrated camera gain map describes a distribution of camera gains as a function of positions in 3D space within the capture volume 190. The 3D imager 150 uses the 3D spatially calibrated camera gain map to adjust illumination intensities such that a signal to noise ratio of the 3D image is increased. The fixed spatial calibration may be performed by the 3D imager 150 during manufacturing of the imaging system 130, or it may be performed during routine manual evaluation of the unit. The fixed spatial calibration is stored in a computer memory (e.g., electrically erasable programmable read-only memory (e-eprom)) for usage during a real-time 3D imaging performed by the 3D imager 150. Face and eye positions are found in the 3D image and the pixel-level gains are pulled from the 3D spatially calibrated gain map in eye regions of the face. For iris imaging performed by the iris imager 160, this pixel-by-pixel gain is converted to illumination intensities to increase the signal-to-noise ratio in the iris image.

To perform a dynamic calibration, in the embodiment of FIG. 2, the subject 142 enters the capture volume 190, and the 3D imager 150 performs a face finding 210 process that includes the 3D imager 150 varying between multiple illumination intensities to illuminate the subject 142 until the 3D imager 150 finds the face. The 3D imager 150 generates a 3D illumination intensity map of the face with the intensity at which the face was found. The 3D illumination intensity map describes a distribution of illumination intensities over the face in three dimensions. The 3D illumination intensity includes an illumination intensity at each 3D location of the face. The 3D imager 150 generates the 3D illumination intensity map of the face based on the 3D spatially calibrated gain map generated by the fixed spatial calibration. For example, the 3D imager 150 extracts gain values for each pixel of the face from the 3D spatially calibrated gain map. The 3D imager 150 adjusts the illumination intensities based on the extracted gain values to generate the 3D illumination intensity map of the face. The 3D imager 150 transmits the 3D illumination intensity map and to the controller 180 for computing illumination intensities of the iris imager 160. The 3D imager 150 may also store the illumination intensity map in memory.

The controller 180 generates an iris illumination intensity map 270 for the iris imager 160. In the embodiment of FIG. 2, the controller 180 receives the 3D illumination intensity map 220 (also referred to I_face) to determine positions of one or more eyes (e.g., 3D coordinates for each eye). The controller 180 performs a face cropping 230 to crop out a region of the face containing the one or more eyes based on the determined eye positions. The controller 180 performs a pixel value averaging 240 to average pixel values of the cropped face region (also referred to pv_face). The controller 180 performs a flat field correction 230 for each eye. Based on positions of the one or more eyes, the flat field correction 230 (also referred to flat_field) converts the 3D illumination intensity map in the 3D coordinate system of the 3D imager 150 into a 2D illumination intensity map in a 2D coordinate system of the iris imager 160. The flat_field is an image that has the same dimensions as the 3D illumination intensity map. Each x, y position of the flat_field is a gain value for the same x, y position in the 3-D illumination intensity map. The flat-field gain image varies with z-position. Pv_face is an average pixel value near the eye position to compute a dynamic global intensity correction. For example, the controller 180 performs the flat field correction 250 based on another look-up table (distinct from the look-up table mentioned above storing the 3D spatially calibrated camera gain map) that represents a relationship between the 3D coordinate system of the 3D imager 150 and the 2D coordinate system of the iris imager 160 at each distance between the imaging system 130 and the one or more eyes. The spatially-dependent flat-field gain map accounts for spatial variations in the illumination intensities. The illumination intensity is viewed approximately as a 2D Gaussian distribution in transverse x, y coordinates. The illumination intensity is the brightest at the front of the capture volume 190 and falls off with the square of the distance at the back of the capture volume 190. The dynamic global gain value is computed by the illumination intensity in the region of the face that contains the eyes.

The controller 180 performs an exposure correction 260 to generate a correction factor (also referred to face corn) that normalizes the 2D illumination map to reduce variations caused by various distances (e.g., along Z dimension in an X-Y-Z coordinate system) and variations caused by ambient light illuminations. In one embodiment, if an image bit depth of an iris image is n (e.g., n=8, 16, or other integers), face_corr=$(2^{n-1})$/pv_face. The controller 180 generates an iris 2D illumination map 270 (also referred to as I_iris) based on I_face, flat_field, and face_corr. In one embodiment, I_iris is a product of I_face, flat_field, and face_corr, e.g., I_iris=I_face×flat_field×face_corr. A difference in quantum efficiencies (also referred to as QE_ratio) may also be taken into account between the 3D imager 150 and the iris imager 160 to calculate the I_iris. For example, QE_ratio=QE1/QE2, wherein QE1 is a quantum efficiency of the 3D imager 150 at a first operating illumination wavelength, and QE2 is a quantum efficiency of the iris imager 160 at a second operating illumination wavelength. Therefore, I_iris=I_face×flat_field×face_corr×QE_ratio. Unknown differences (also referred to as ad_hoc) may also be taken into account, e.g., I_iris=I_face×flat_field×face_corr×QE_ratio×ad_hoc. For example, ad_hoc may be a difference in exposure (also referred to as Exp_ratio) between the 3D imager 150 and the iris imager 160. In one embodiment, Exp_ratio=Exp1/Exp2, wherein Exp1 indicates an exposure of the 3D imager 150, and Exp2 is an exposure of the iris imager 160. To determine the ad_hoc, the iris imager 160 captures an iris image and adjusts the ad-hoc factor until the eye is just below saturation. For the focus imaging, one more factor that is a fraction of the final iris image value is determined. This is also, empirically determined by adjusting the value until the glint is just below saturation.

The controller 180 instructs the iris imager 160 to focus an iris region of the subject 142 based on the eye positions determined by the 3D imager 150 and to capture the iris image 110 based on the iris illumination intensity map 270. As such, due to the iris illumination intensity map 270, the iris imager 160 is able to capture an unsaturated iris image with acceptable signal to noise characteristics. In the embodiment of FIG. 2, a location Z 280 represents an eye position of the subject 142 along an optical path. The controller 180 instructs the iris imager 160 to use the location Z as an initial focus position, and then instructs the iris imager 160 to adjust the focus position in a range between a location Z−ΔZ and a location Z+ΔZ for capturing the iris image 110.

Figure 3:
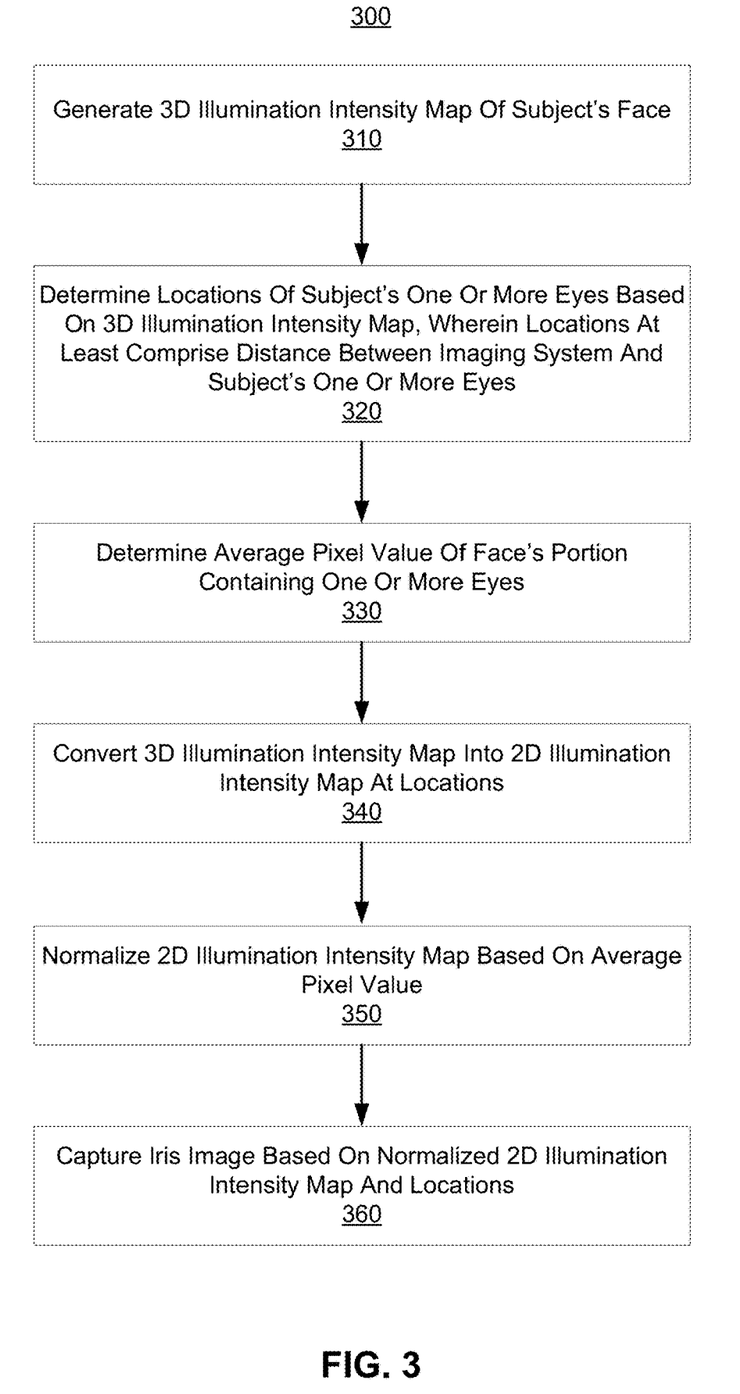
FIG. 3 is a flowchart illustrating a process for capturing an iris image using fixed spatial and dynamic calibrations to compute illumination intensities, in accordance with an embodiment.

FIG. 3 is a flowchart illustrating a process 300 for capturing an iris image using fixed spatial and dynamic calibrations, in accordance with an embodiment. The process 300 may be performed by the imaging system 130. The process 300 may include different or additional steps than those described in conjunction with FIG. 3 in some embodiments or perform steps in different orders than the order described in conjunction with FIG. 3.

The imaging system 130 generates 310 a 3D illumination intensity map of a subject's face. For example, the 3D imager 150 generates the 3D illumination intensity map of the face of the subject 142. The imaging system 130 determines 320 locations of the subject's one or more eyes based on the 3D illumination intensity map, wherein the locations at least comprise a distance between the imaging system 130 and the subject's one or more eyes. The imaging system 130 determines 330 an average pixel value of a face's portion containing the one or more eyes. For example, the imaging system 130 crops out a region of the face containing the one or more eyes based on the locations of the eyes. The imaging system 130 averages pixel values of the cropped face region to determine the average pixel value. The imaging system 130 converts 340 the 3D illumination intensity map into 2D illumination intensity map at the locations. For example, based on the locations of the eyes, the imaging system 130 uses the look-up table to convert the 3D illumination intensity map into 2D illumination intensity map at each distance between the imaging system 130 and the subject's one or more eyes. The imaging system 130 normalizes 350 the 2D illumination intensity map based on the average pixel value to generate an iris illumination intensity map in the 2D coordinate system of the iris imager 160. The imaging system 130 captures 360 an iris image based on the normalized 2D illumination intensity map and locations. For example, the iris imager 160 adjusts a focus position based on the eye positions determined by the 3D illumination intensity map from the 3D imager 150, and the iris imager 160 captures the iris image 110 based on the adjusted focus position and the iris illumination intensity map. An example is described above in FIG. 2.

Binding of Selfie Face Image to Iris Image for Biometric Identity Enrollment

The following description leverages the imaging system 130 described in the previous sections to provide a process for associating (or "binding") selfie face images to iris images in a secure data storage for use in biometric identify enrollment.

The imaging system 130 at least includes a database to store information associated with the selfie face image (e.g., biometric data, biographic data, and metadata), and similarly for the iris image. The iris image provides a high biometric accuracy that results in a high identity accuracy in on-site enrollments.

Figure 4:
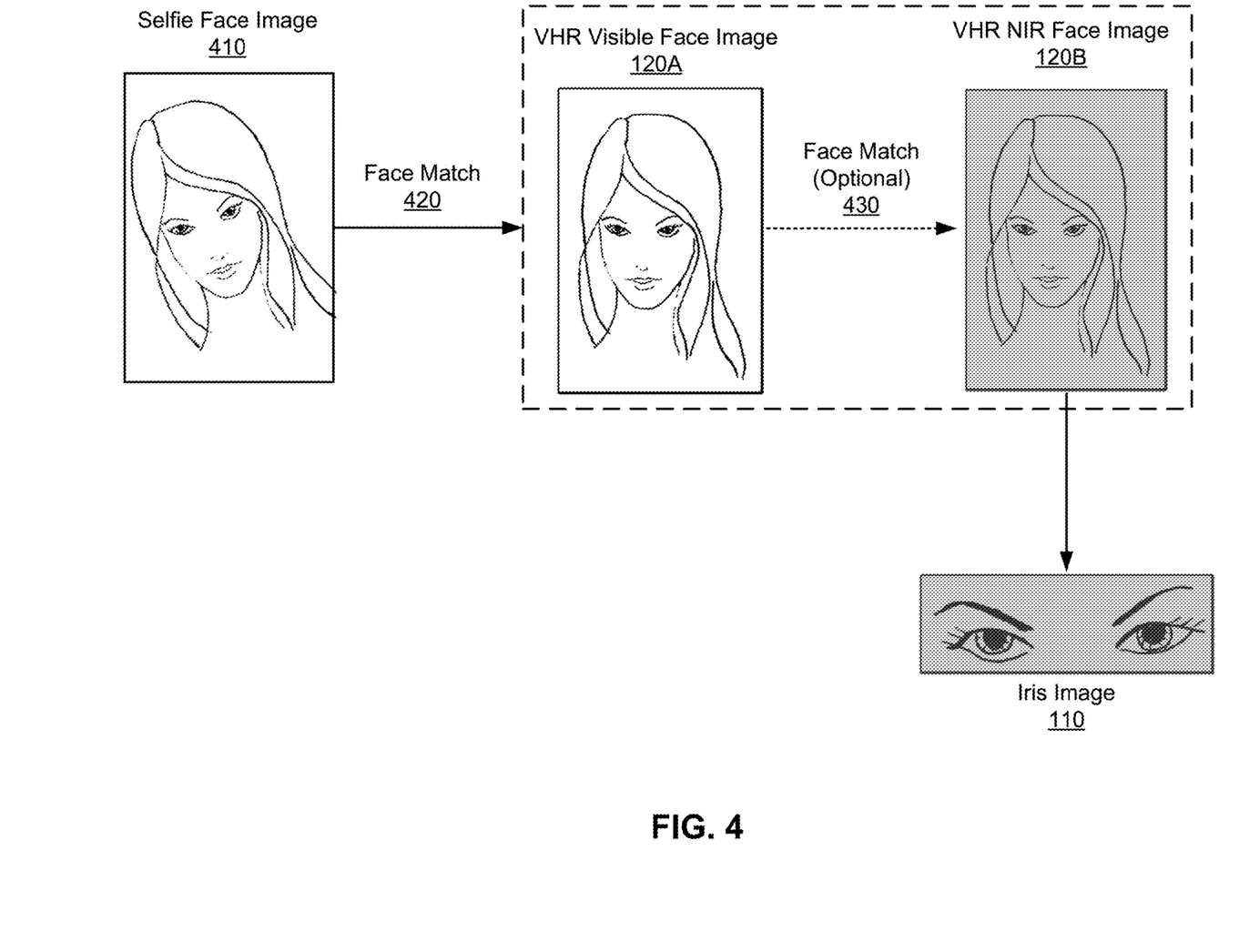
FIG. 4 is an example of binding a selfie face image to a iris image, in accordance with an embodiment.

FIG. 4 is an example of binding a selfie face image 410 to the iris image 110, in accordance with an embodiment. The selfie face image 410 may be captured by the subject 142 using a smartphone camera or a webcam, as part of an identity pre-enrollment process. The selfie face image 410 is submitted to the imaging system 130, typically along with other biometric data, biographic data, and metadata. Upon arrival at a specific geographical location designated for an on-site enrollment, a VHR visible image 120A and a VHR NIR image 120B are simultaneously captured by the face imager 170. The selfie face image 410 is retrieved from the imaging system 130, based on reference credentials (e.g., a unique number, or a token such as a 2D barcode) supplied by the subject 142 at the specific geographical location. A face match is performed between the selfie face image 410 and the VHR visible face image 120A via a biometric algorithm performed by a computer. A successful face match 420 indicates that the two face images belong to the same individual, and thus it can be concluded that the subject 142 presenting in the VHR visible face image 120A is the same subject 142 whose face was captured by the selfie face image 410 during the pre-enrollment.

An optional face match 430 may also be performed between the VHR visible face image 120A and the VHR NIR face image 120B using a biometric algorithm optimized for a cross-wavelength matching. A successful optional face match indicates that the two VHR face images belong to the same individual. This may be valuable for providing assurances as to a biometric integrity.

The iris image 110 is segmented from the VHR NIR face image 120B using standard techniques. The resulting iris image 110 and the two VHR face images are logically bound to the identity record created in the stored information. In one implementation, an iris image including a single eye may be segmented from the VHR face image 120B. Alternatively, two iris images, each including a single eye, may be segmented from the VHR face image 120B. The pre-enrolled identity may also be supplemented with biometric-standards-compliant face and iris images. In such an embodiment, the VHR NIR face image is captured at such a resolution so that the iris image is at least 640×480 pixels. The dual-wavelength face images are retained as they provide the non-refutable link between the selfie-face image, and the iris images. As such, it enables a selfie-pre-enrollment face image to be irrefutably bound to one more iris images.

In various embodiments, if only iris images are used as an output from the image system 130, not VHR face images, then it may be sufficient for the periocular region, rather than the entire face, to be used for matching.

Figure 5:
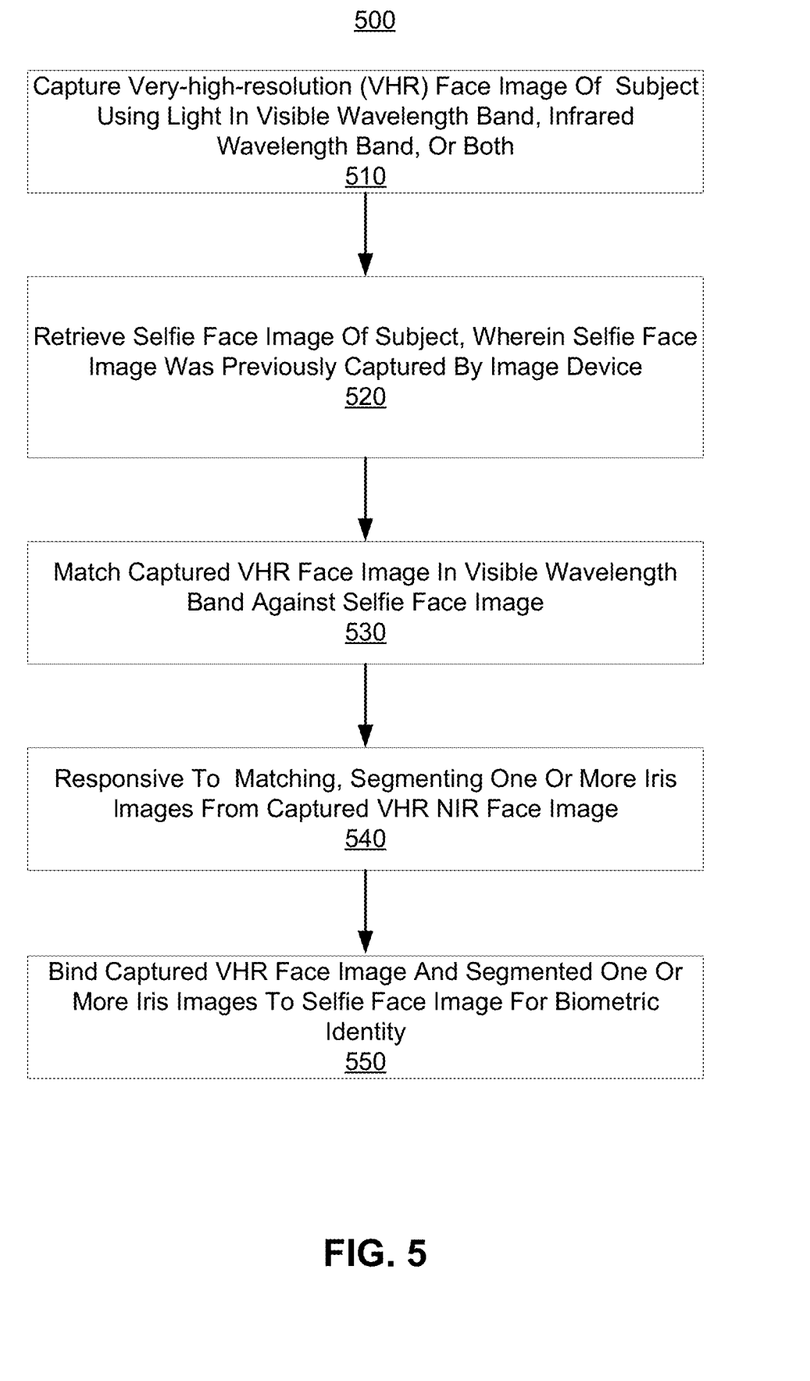
FIG. 5 is a flowchart illustrating a process of binding a selfie face image to one or two iris images, in accordance with an embodiment.

FIG. 5 is a flowchart illustrating a process 500 of binding a selfie face image to one or two iris images, in accordance with an embodiment. The process 500 is performed by the imaging system 130. In other embodiments, the process 500 includes different, additional, or fewer steps than those depicted by FIG. 5. Additionally, in some embodiments, the steps described in conjunction with FIG. 5 may be performed in different orders.

The imaging system 130 captures 510 a VHR face image of a subject using light in a visible wavelength band and a NIR wavelength band. For example, the face imager 170 captures the VHR visible face image 120A and the VHR NIR face image 120B. The imaging system 130 retrieves 520 a selfie face image of the subject, wherein the selfie face image was previously captured using an imaging device. For example, the imaging system 130 retrieves the selfie face image 410. The imaging system 130 matches 530 the captured VHR face image in the visible wavelength band against the selfie face image. Responsive to the matching, the imaging system 130 segments 540 one or more iris images from the NIR VHR face image. For example, the imaging system 130 segments two iris images, each having a single eye. In another example, the imaging system 130 segments a single iris image including a single eye or two eyes. The imaging system 130 binds the captured VHR face image and the segmented one or more iris images to the selfie face image for biometric identity.

Application Examples

A. Payment

Pre-enrollment enables an event attendee to book and plan their event experience from the comfort of their own home. During this process, they may have the option to submit a selfie face image and a payment card, and may opt in for biometric payment at the event. Upon arrival at the event, a passive enrollment may be conducted: the attendee provides their ticket (mobile or paper) along with their live face (in visible light and NIR). The visible face image is matched against the selfie face image submitted at the pre-enrollment process, to confirm that the event ticket holder is the same person who purchased the ticket. The NIR face image is processed to provide one or more iris images that are stored against the associated identity. When making a payment, instead of swiping a credit card or handling cash, the buyer glances at the imaging system 130 to authenticate the payment using their irises. One or more iris images are captured and matched to the attendee's profile, and the transaction then is run against their stored payment card. From initiating biometric capture to submitting the payment may take just a few moments.

B. Border Control

A similar process is used to provide an expedited immigration and/or a border control, for those countries which use iris biometrics as part of their national identity systems. A traveler submits a selfie face image during a pre-registration before starting their journey. Upon arrival, the imaging system 130 automatically captures both VHR visible and NIR face images of the traveler, and provides the corresponding one or more iris images. These iris images are used for matching against immigration databases to confirm the traveler's identity.

C. Physical Access Control

A similar process is used to provide an accelerated access to secure buildings and other physical spaces: A visitor may submit a selfie face image during a pre-registration whilst making an appointment. Upon arrival, the imaging system 130 automatically captures the face images of the visitor (in both visible and NIR), and provide the corresponding iris images. These iris images is used to provide expedited biometric access control at perimeter and interior touchpoints, to ensure that only approved individuals are allowed access.

Additional Considerations

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. Any of these steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. The computer portions of such an apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
capturing a first face image of a subject using light in a visible wavelength range;
capturing a second face image of the subject using light in a near infrared wavelength range;
retrieving a selfie face image of a subject, wherein the selfie face image was previously captured using an imaging device that is different from an imager capturing the first face image and the second face image;
matching, by a biometric algorithm, a face portion of the first face image against a face portion of the selfie face image, wherein the face portion for each at least comprises an iris portion;
determining a successful match by the biometric algorithm, the successful match indicating that the subject in the first face image is the same subject as the subject in the selfie face image;
responsive to determining the successful match, segmenting one or more iris portions from the second face image to generate one or more iris images, each iris image corresponding to an iris portion; and
storing in a database an association between (i) the one or more iris images and the (ii) selfie face image, the association indicating that the subject in the one or more iris images is the same subject as the subject in the selfie face image.

2. The method of claim 1, wherein the first face image and the second face image are simultaneously captured by the imager.

3. The method of claim 1, wherein the imager is a face imager.

4. The method of claim 1, wherein the imager is an iris imager.

5. The method of claim 1, further comprising:
matching, by a cross-wavelength matching biometric algorithm, the face portion of the first face image against a face portion of the second face image; and
determining a second successful match, the successful match indicating that the subject in the first face image is the same subject as the subject in the second face image, wherein segmenting the one or more iris portions from the second image is performed responsive to determining the successful match and determining the second successful match.

6. The method of claim 1, further comprising associating the second face image to the selfie face image for biometric identity.

7. The method of claim 1, further comprising associating the one or more iris images to the selfie face image to making a payment.

8. The method of claim 1, further comprising associating the one or more iris images to the selfie face image to match against databases to confirm a traveler's identity.

9. The method of claim 1, further comprising associating and the one or more iris images to the selfie face image to access to secure buildings and other physical spaces.

10. The method of claim 1, further comprising storing in the database an association between the first image and the selfie image.

11. The method of claim 1, further comprising storing in the database an association between the selfie image and biographic data.

12. A system comprising:
an imager configured to capture a first face image of a subject using light in a visible wavelength range and to capture a second face image of the subject using light in a near infrared wavelength range; and
a processor configured to execute computer-executable instructions for performing a method comprising:
retrieving a selfie face image of a subject, wherein the selfie face image was previously captured using an imaging device that is different from the imager;
matching, by a biometric algorithm, a face portion of the first face image against a face portion of the selfie face image, wherein the face portion for each at least comprises an iris portion;
determining a successful match by the biometric algorithm, the successful match indicating that the subject in the first face image is the same subject as the subject in the selfie face image;
responsive to determining the successful match, segmenting one or more iris portions from the second face image to generate one or more iris images, each iris image corresponding to an iris portion; and
storing in a database an association between (i) the one or more iris images to the (ii) selfie face image, the association indicating that the subject in the one or more iris images is the same subject as the subject in the selfie face image.

13. The system of claim 12, wherein the first face image and the second face image are simultaneously captured by the imager.

14. The system of claim 12, wherein the imager is a face imager.

15. The system of claim 12, wherein the imager is an iris imager.

16. The system of claim 12, further comprising:
matching, by a cross-wavelength matching biometric algorithm, the face portion of the first image against a face portion of the second face image; and
determining a second successful match, the successful match indicating that the subject in the first face image is the same subject as the subject in the second face image,
wherein segmenting the one or more iris portions from the second image is performed responsive to determining the successful match and determining the second successful match.

17. The system of claim 12, further comprising associating the second face image to the selfie face image for biometric identity.

18. The system of claim 12, further comprising associating the one or more iris images to the selfie face image to making a payment.

19. The system of claim 12, further comprising associating the one or more iris images to the selfie face image to match against databases to confirm a traveler's identity.

20. The system of claim 12, further comprising associating the one or more iris images to the selfie face image to access to secure buildings and other physical spaces.

* * * * *